(12) United States Patent
Egan et al.

(10) Patent No.: US 9,264,325 B2
(45) Date of Patent: Feb. 16, 2016

(54) VOICE OPTIMIZATION IN A NETWORK HAVING VOICE OVER INTERNET PROTOCOL COMMUNICATION DEVICES

(71) Applicant: RPX CLEARINGHOUSE LLC, Dover, DE (US)

(72) Inventors: Brian P Egan, Nepean (CA); Robert P Macaulay, Nepean (CA); Milos Vodesedalek, Nepean (CA)

(73) Assignee: RPX CLEARINGHOUSE LLC, Dover, DE (US)

(*) Notice: Subject to any disclaimer, the term of this patent is extended or adjusted under 35 U.S.C. 154(b) by 65 days.

(21) Appl. No.: 13/901,107

(22) Filed: May 23, 2013

(65) Prior Publication Data

US 2013/0258891 A1   Oct. 3, 2013

Related U.S. Application Data

(63) Continuation of application No. 12/749,270, filed on Mar. 29, 2010, now Pat. No. 8,451,835, which is a continuation of application No. 09/750,766, filed on Dec. 28, 2000, now Pat. No. 7,787,447.

(51) Int. Cl.
| | |
|---|---|
| *H04L 12/28* | (2006.01) |
| *H04L 12/26* | (2006.01) |
| *H04L 12/24* | (2006.01) |
| *H04L 12/801* | (2013.01) |
| *H04L 12/805* | (2013.01) |
| *H04L 12/811* | (2013.01) |
| *H04M 3/51* | (2006.01) |
| *H04M 3/523* | (2006.01) |
| *H04M 3/56* | (2006.01) |

(52) U.S. Cl.
CPC ............ *H04L 43/08* (2013.01); *H04L 41/0823* (2013.01); *H04L 43/16* (2013.01); *H04L 47/10* (2013.01); *H04L 47/365* (2013.01); *H04L 47/38* (2013.01); *H04M 3/5191* (2013.01); *H04M 3/5233* (2013.01); *H04M 3/56* (2013.01); *H04M 2203/2011* (2013.01)

(58) Field of Classification Search
None
See application file for complete search history.

(56) References Cited

U.S. PATENT DOCUMENTS

| | | | |
|---|---|---|---|
| 5,764,639 | A | 6/1998 | Staples et al. |
| 6,141,341 | A | 10/2000 | Jones et al. |
| 6,195,705 | B1 | 2/2001 | Leung |
| RE37,276 | E | 7/2001 | Lantto |
| 6,292,480 | B1 | 9/2001 | May |
| 6,327,267 | B1 | 12/2001 | Valentine et al. |

(Continued)

OTHER PUBLICATIONS

Non-Final Office Action for U.S. Appl. No. 09/750,766, mailed Jun. 7, 2004, 7 pages.

(Continued)

*Primary Examiner* — Clemence Han
(74) *Attorney, Agent, or Firm* — Withrow & Terranova, PLLC

(57) ABSTRACT

An apparatus and a method of optimizing voice quality on a network having end-points that are voice over Internet Protocol (IP) devices. Default parameters of the end-points are initialized. Network performance parameters are measured and evaluated to determine whether they signify that connection to the network is below a desired level of operation. If so, the default parameters of the end-points are re-set based on the evaluation. The adjustment may entail re-negotiating the CODEC connection and re-setting parameters for packet size and resetting parameters for jitter buffer size.

31 Claims, 5 Drawing Sheets

(56) References Cited

U.S. PATENT DOCUMENTS

| | | | |
|---|---|---|---|
| 6,356,545 | B1 | 3/2002 | Vargo et al. |
| 6,421,720 | B2 | 7/2002 | Fitzgerald |
| 6,434,606 | B1 | 8/2002 | Borella et al. |
| 6,445,697 | B1 | 9/2002 | Fenton |
| 6,452,950 | B1 | 9/2002 | Ohlsson et al. |
| 6,542,499 | B1 | 4/2003 | Murphy et al. |
| 6,560,223 | B1 | 5/2003 | Egan et al. |
| 6,678,250 | B1 | 1/2004 | Grabelsky et al. |
| 6,683,889 | B1 * | 1/2004 | Shaffer et al. ............... 370/516 |
| 6,700,895 | B1 * | 3/2004 | Kroll ........................... 370/412 |
| 6,747,999 | B1 | 6/2004 | Grosberg et al. |
| 6,778,545 | B1 * | 8/2004 | Moataghed ................. 370/413 |
| 6,785,267 | B1 * | 8/2004 | Knappe ....................... 370/353 |
| 6,975,629 | B2 * | 12/2005 | Welin .......................... 370/392 |
| 6,980,569 | B1 | 12/2005 | Beyda et al. |
| 7,023,839 | B1 * | 4/2006 | Shaffer et al. ............... 370/356 |
| 7,307,980 | B1 * | 12/2007 | Shah ........................... 370/352 |
| 7,787,447 | B1 | 8/2010 | Egan et al. |
| 2002/0016937 | A1 | 2/2002 | Houh |
| 2002/0075857 | A1 | 6/2002 | LeBlanc |
| 2002/0101886 | A1 | 8/2002 | Jagadeesan |
| 2002/0114285 | A1 | 8/2002 | LeBlanc |
| 2003/0227908 | A1 | 12/2003 | Scoggins et al. |

OTHER PUBLICATIONS

Non-Final Office Action for U.S. Appl. No. 09/750,766, mailed Feb. 25, 2005, 6 pages.

Final Office Action for U.S. Appl. No. 09/750,766, mailed Aug. 10, 2005, 7 pages.

Non-Final Office Action for U.S. Appl. No. 09/750,766, mailed Feb. 27, 2006, 7 pages.

Final Office Action for U.S. Appl. No. 09/750,766, mailed Feb. 28, 2007, 8 pages.

Advisory Action for U.S. Appl. No. 09/750,766, mailed Aug. 30, 2007, 3 pages.

Non-Final Office Action for U.S. Appl. No. 09/750,766, mailed Mar. 19, 2008, 7 pages.

Final Office Action for U.S. Appl. No. 09/750,766, mailed Oct. 6, 2008, 7 pages.

Notice of Allowance for U.S. Appl. No. 09/750,766, mailed Jul. 20, 2009, 6 pages.

Non-Final Office Action for U.S. Appl. No. 12/749,270, mailed Aug. 1, 2012, 8 pages.

Final Office Action for U.S. Appl. No. 12/749,270, mailed Nov. 16, 2012, 6 pages.

Notice of Allowance for U.S. Appl. No. 12/749,270, mailed Jan. 25, 2013, 7 pages.

* cited by examiner

VOICE OPTIMIZATION IN A NETWORK HAVING VOICE OVER INTERNET PROTOCOL COMMUNICATION DEVICES

PRIORITY APPLICATIONS

The present application is a continuation application of pending U.S. patent application Ser. No. 12/749,270, filed Mar. 29, 2010, entitled "VOICE OPTIMIZATION IN A NETWORK HAVING VOICE OVER THE INTERNET PROTOCOL COMMUNICATION DEVICES", which is a continuation application of U.S. patent application Ser. No. 09/750,766, filed Dec. 28, 2000, entitled "VOICE OPTIMIZATION IN A NETWORK HAVING VOICE OVER THE INTERNET PROTOCOL COMMUNICATION DEVICES," issued as U.S. Pat. No. 7,787,447, on Aug. 31, 2010, which are incorporated herein by reference in their entirety.

RELATED APPLICATIONS

The present application is related to U.S. patent application Ser. No. 09/220,232, filed Dec. 23, 1998, issued as U.S. Pat. No. 6,560,223, on May 6, 2003, which is incorporated herein by reference in its entirety

BACKGROUND

1. Field of Disclosure

The invention relates to optimizing voice quality on networks that have voice over Internet Protocol communication devices. The optimization is based on taking and evaluating measurements of network performance pertaining to quality of the network connection.

2. Discussion of Related Art

The contents of U.S. Ser. No. 09/220,232, now U.S. Pat. No. 6,560,223, are incorporated herein by reference.

Support for end-to-end voice calls using the Internet as an alternative to traditional public switched telephone networks (PSTN) is conventional. Unlike the PSTN, which is circuit-switched, the Internet is packet-switched; communication on the Internet is accomplished by transmitting and receiving packets of data.

In addition to data, each packet contains an address to ensure that it is routed correctly. The format of these packets is defined by the Internet Protocol (IP). One type of allowable data is encoded, digitized voice. Thus, voice over IP (VOIP) is voice that is packetized as defined by IP, and communicated over the Internet or some other IP network for telephone-like communication.

Devices such as personal computers (PC) that are VoIP ready, wireless VoIP devices, intelligent phones that are VoIP ready, conferencing units, trunks that are VoIP ready, multimedia devices that are VoIP ready, and plain old telephone system (POTS) telephones connected to VoIP gateways may be VoIP endpoints. Examples include Microsoft's NetMeeting, Nortel Networks's soft-client and IP based personal digital assistant (PDA) devices.

These end-points require real-time performance over IP networks. The end points are assumed to be distributed on one or more IP networks. Some devices will be on the same subnet on the same local area network (LAN) segment while others will be on different subnets, some of which could be at the end of a slow wide area network (WAN) connection. A problem arises, however, with respect to voice quality and other quality of service (QoS) parameters in an IP network.

Conventionally, bandwidth is reserved for particular IP end points by marking their packets with a priority level. However, about 90% of the networks today are not policy managed. With respect to the 10% that are policy managed, there are no solutions to the problems that exist when the bandwidth is insufficient to support a badly configured IP endpoint.

Conventional software tools are available to help assess the performance of a network by measuring parameters of network performance. Such tools include a Ping tool, a Network trace tool and a packet loss measurement tool. These tools are standard with MICROSOFT WINDOWS product. They run from the command line (found under Start, Run on all WINDOWS operating systems). The commands are 'ping IP_Address' or 'Trace IP_Address'. These tools are available with TCP/IP protocol stacks found under operating systems such as Linux/VxWorks, etc.

With the telecommunications networks transitioning from circuit switching to packet switching, phones, trunks and wireless devices are expected to be VoIP capable. Controlling these phones, trunks, and wireless devices to optimize media performance is desired.

SUMMARY OF THE DETAILED DESCRIPTION

An aspect of the invention resides in an apparatus and a method of optimizing voice quality on a network having endpoint devices, such as voice over Internet Protocol (IP) devices. The invention includes initializing default parameters for the end-point devices with respect to choice of preferred CODEC, number of voice samples per IP packet and jitter buffer size. Further, performance parameters are measured and if warranted by an indication from the performance parameters that the connection to the network is below a desired level of operation, the default parameters are adjusted. The measurements include network bandwidth, number of network hops to the IP end-point devices, round trip delay and packet loss over a time duration. Software tools used to obtain the measurements may include a ping tool, a network trace tool and a packet loss measurement tool. The adjustment of the default parameters may involve re-negotiating a CODEC connection, re-setting the packet size and/or re-setting the jitter buffer size.

Preferably, a private branch exchange is on the network. A register is configured to register the end-point VOIP devices with the private branch exchange (PBX) on the network. In response to the register completing registration of the endpoint devices with the PBX, a terminal proxy server may set the default parameters of the registered end-point devices on the basis of measured performance parameters. Thereafter, the default parameters are adjusted as necessary to better optimize the connection on the basis of changes to the performance parameters as measured by the software tools.

BRIEF DESCRIPTION OF THE FIGURES

For a better understanding of the present invention, reference is made to the following description and accompanying drawing, while the scope of the invention is set forth in the appended claims.

DETAILED DESCRIPTION

Figure 1:
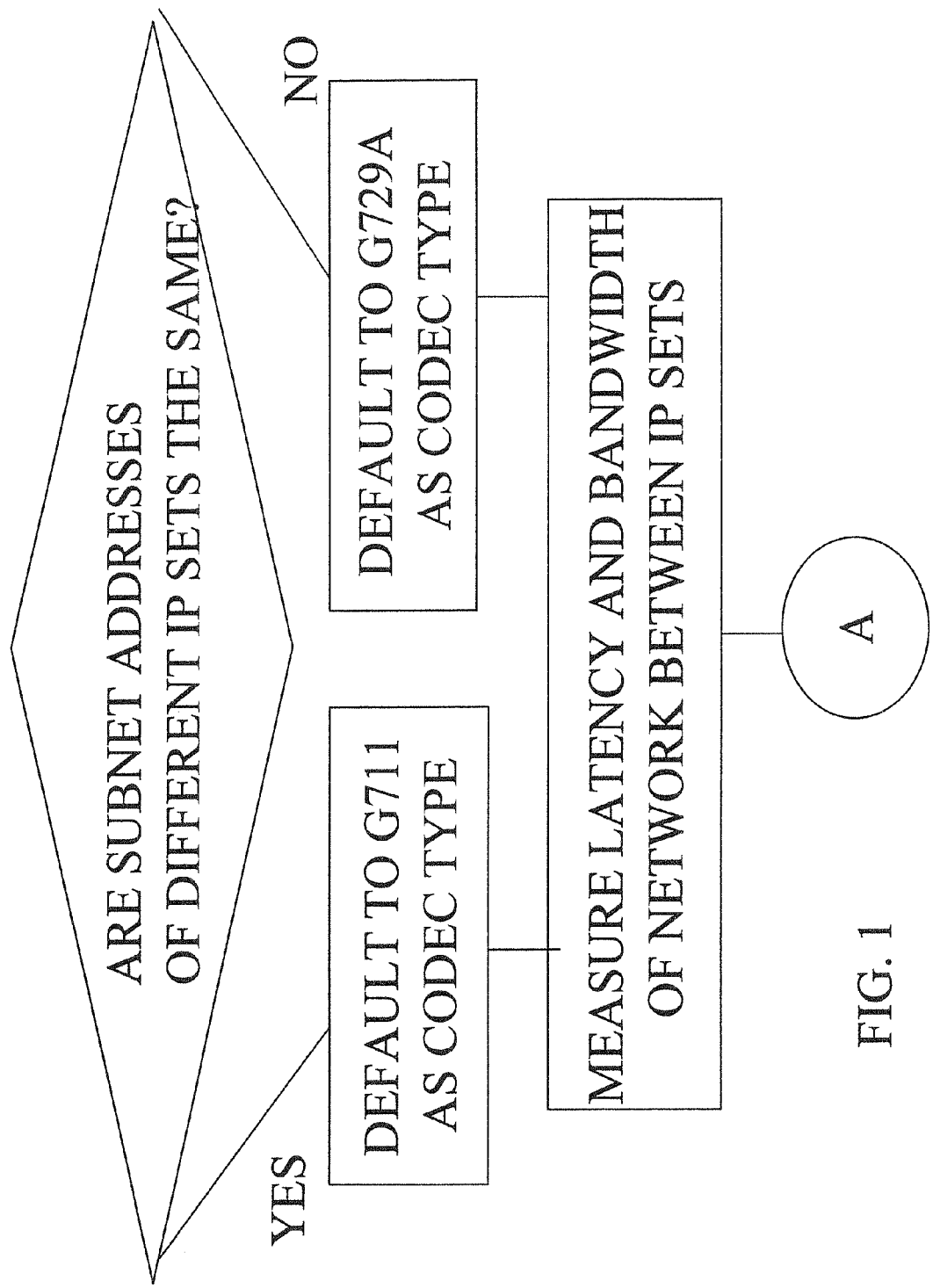
FIG. 1 shows a flow chart representing a condition of the invention at initialization time.
Figure 1:
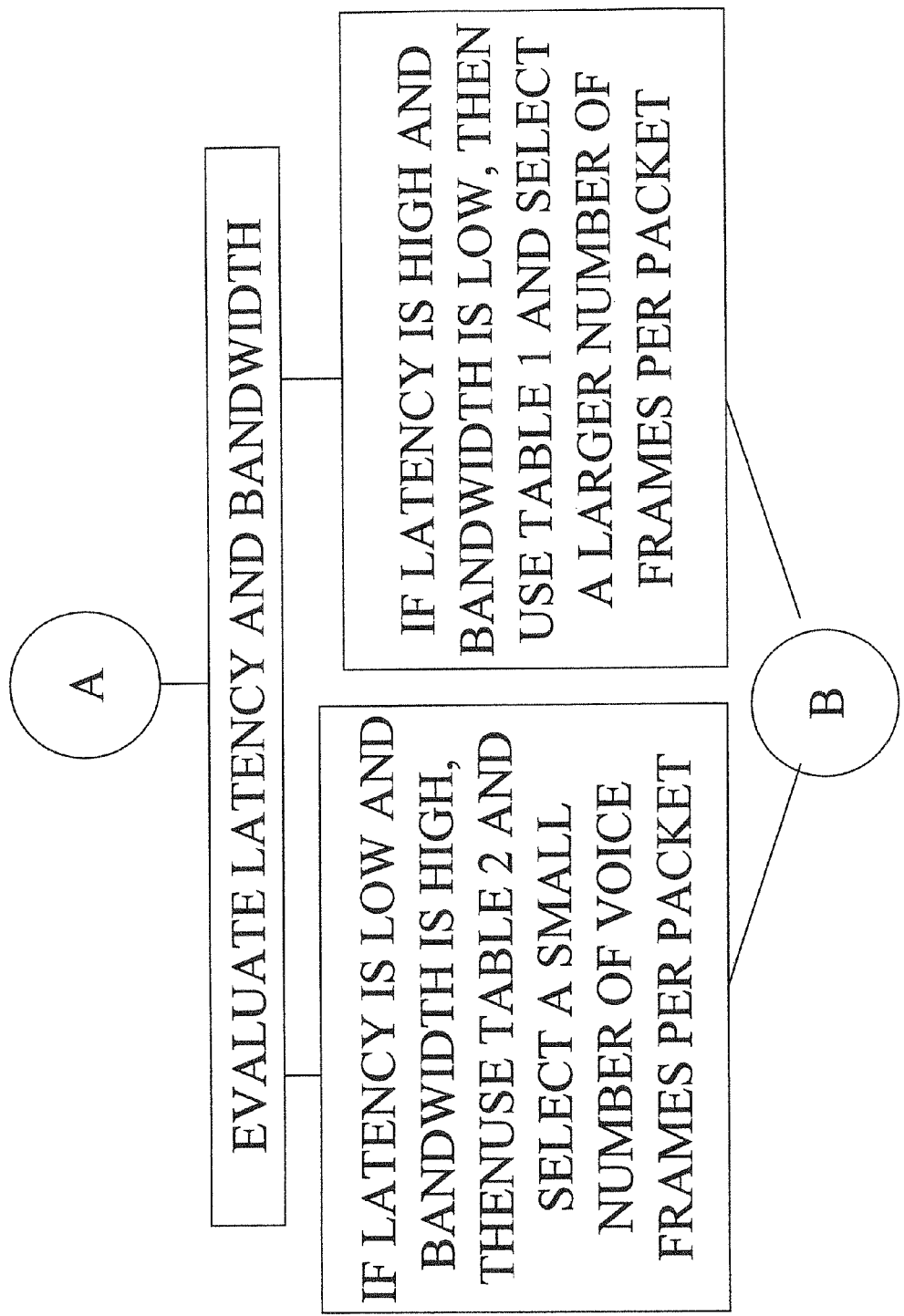
Figure 1:
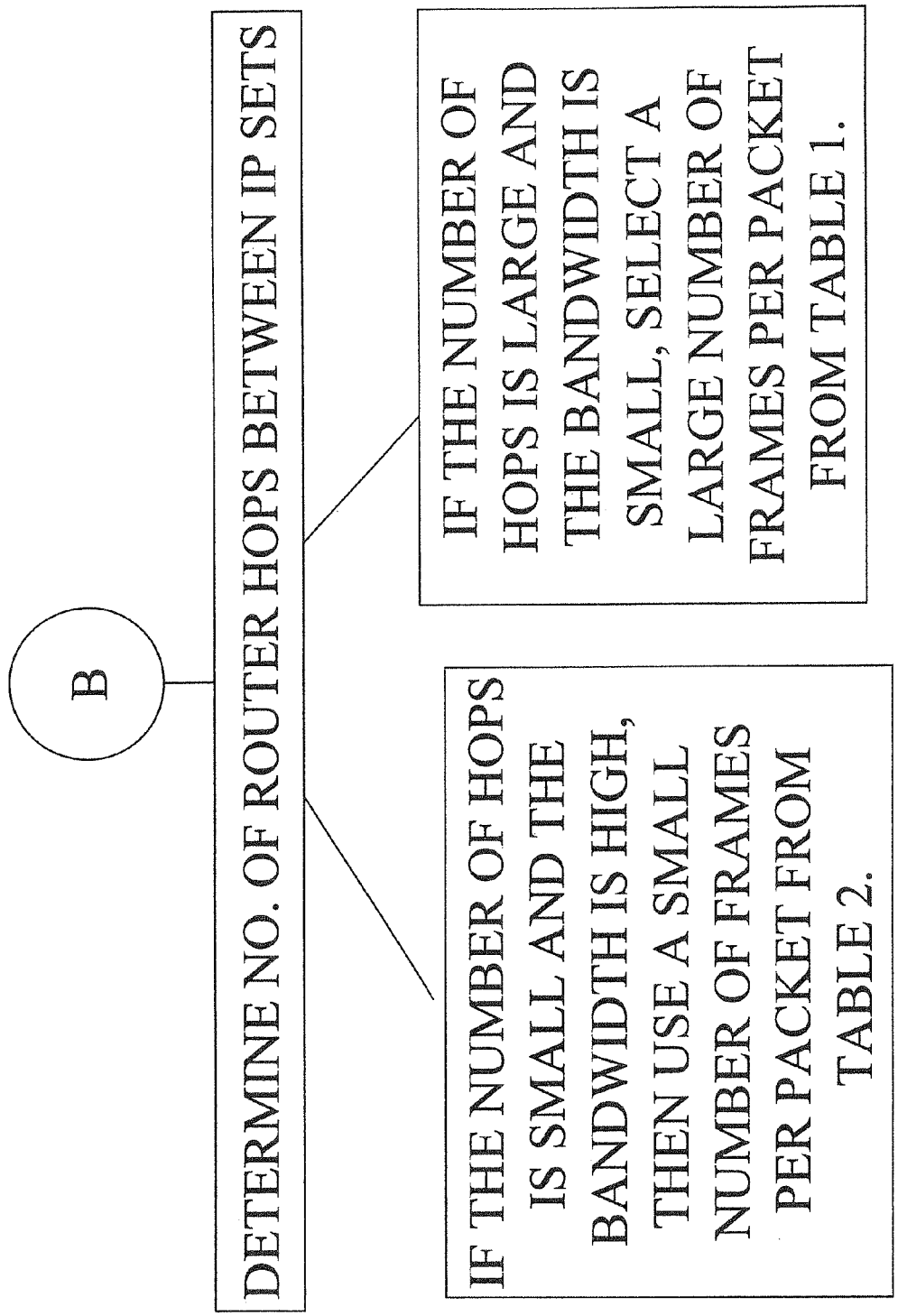
Figure 2:
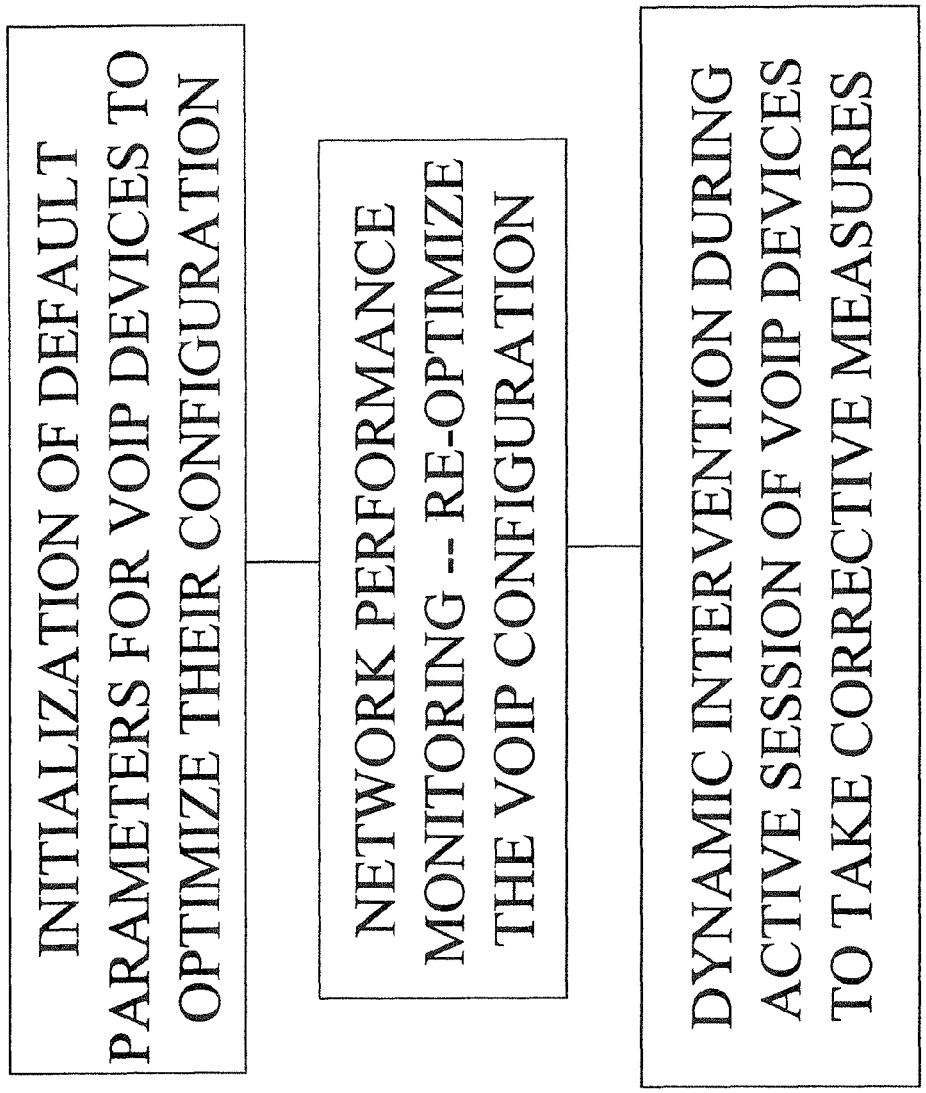
FIG. 2 shows a flow chart representing a three-phase approach in accordance with the invention.
Figure 3:
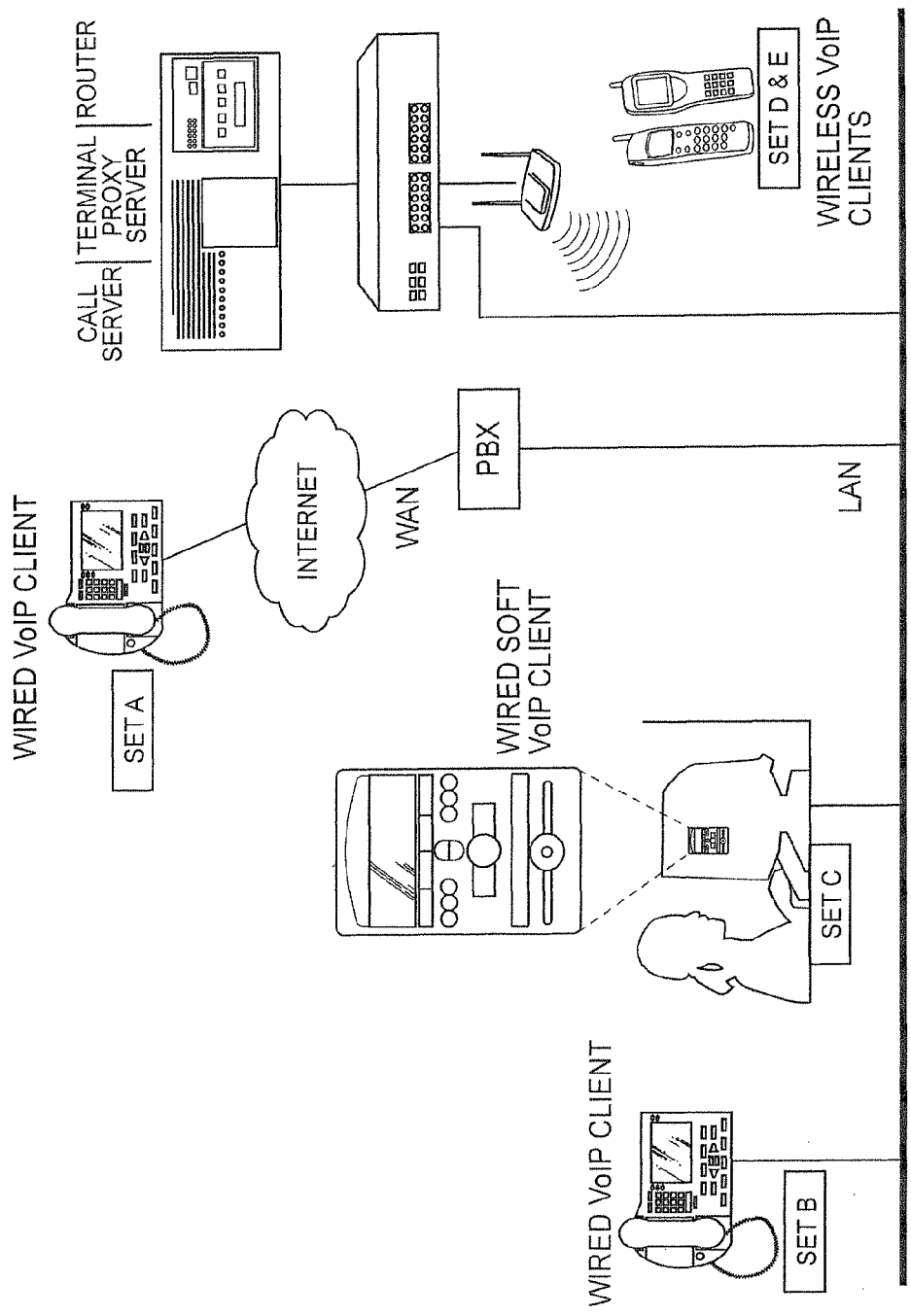
FIG. 3 shows a schematic representation of IP telephony in accordance with the invention.

Before discussing the FIGS. 1-3, a brief discussion about various terms used in this patent application may be helpful in better understanding the invention.

Bandwidth usually refers to maximum available bit rate for a specific application. In a specific embodiment, synchronous, interactive, and real-time applications, which are bandwidth-sensitive, can require minimum bandwidth guarantees, and can require sustained and burst-scale bit-rates. On the other hand, network administrators may want to limit bandwidth taken by non-productive traffic. However, even though bandwidth may be allocated for specified applications, it does not mean that these applications may be using that bandwidth.

Jitter generally refers to variation in delay (e.g., the delay is not constant for all packets of a given flow) for a particular application. Real-time applications have maximum jitter limits. Applications such as real-audio and video do some advanced buffering in an attempt to overcome variation in packet delays—the amount of buffering is determined by the expected jitter.

A jitter buffer is a variable length buffer that stores voice packets. The size of the jitter buffer may be dependent upon the variation in the end-to-end packet delay in the network and can be dynamically adjusted based upon, for example, this packet delay variation.

Latency generally refers to the delay experienced by a packet from the source to destination. Latency requirements are typically specified as mean-delay and worst case delay in some cases. Delay is a result of propagation delay, due to physical medium and queuing at intermediate nodes such as routers, gateways, servers, etc. A certain portion of the delay can be controlled by changing the way in which the queues are serviced at the intermediate nodes, and by controlling congestion at bottleneck points. Some examples of delay measurements are packet round-trip delay and connection response time.

A Ping tool includes a routine that sends a packet onto the network and obtains a value of the average delay encountered by that packet in reaching the destination and returning.

A network trace tool includes a routine that captures and records events and states that occur while the network is operating. Events in a trace chronology may be paired, forming event-pairs. Examples of event-pairs include the start and end times.

A packet loss measurement tool measures the rate of packet loss over a period of time. Packet loss is a rate of loss in a packet or a portion of packets that is generally caused by noise or failure of network elements (e.g., routers, servers) to forward or deliver packets. Packet loss is usually an indication of severe congestion, overload of an element, or element failure (e.g., if a server is down). Even if the packet was not dropped but just delayed, protocols and applications may assume it was lost. Packet loss can cause application timeouts, loss of quality or delay due to retransmitted packets. Indirect results of packet loss may also be measured (e.g., connection retries or data retransmits).

The default parameters of VoIP end-point devices need to be initialized (FIG. 1) and adjusted later as necessary (FIG. 2). FIG. 3 illustrates an example of VoIP end-point devices on a LAN. These devices include a wired VoIP Client (Set B), a wired soft VoIP Client (Set C) and Wireless VoIP CLIENTS (SETS D & E). These identified end-point devices are for illustration purposes only, there can be more or less end-point devices of different types and additional LANs and additional subnets, etc.

The LAN is connected to a WAN via a call server, terminal proxy server and router in a conventional manner. A wired VoIP Client (Set A) is in communication with one or more of the VoIP devices of the LAN via the WAN. The parameters that may 25 be optimized include CODEC selection, packet size (that is, the number of frames per packet), desired latency, packet loss, available bandwidth, number of router hops, and jitter buffer size.

When a VoIP end-point device registers with an IP PBX, the IP PBX may perform a number of tests to determine the optimum configuration for that end-point. It can measure network bandwidth, the number of network hops (if any) to the end point, the round trip delay and/or the packet loss over a short period of time. These tests can easily be done using a ping tool, a network trace tool and/or a packet loss measurement tool. After initialization, one or more of these tools can be used on regular periods to determine network performance. During active communications, a call re-establishment can be initiated (manually or automatically) to re-apply these parameters.

Turning to FIG. 1, at the time of initialization, the VoIP end-point device registers with the PBX. In response to the registration, a terminal proxy server uses a protocol to instruct the end-point device to use a CODEC of a particular type, a jitter buffer of a particular size, a frame size of so many voice samples, etc. That is, the terminal proxy server sets the default settings for that VoIP end-point device. When the VoIP end-point device attempts to make a call, the subnet addresses of different IP sets are compared.

If the comparison shows that the subnet addresses differ, then the default is set using G729A as the preferred CODEC type for both IP end-point devices, although other CODECS could be chosen as the default CODEC. Otherwise, if the comparison shows that the subnet addresses are the same, then the default is set using G711 as the preferred CODEC type for both IP sets, although other CODECS could be chosen as the default CODEC.

In addition, software tools are used to measure network performance parameters (e.g., jitter, available bandwidth, delay, packet loss, latency, etc). In obtaining such measurements, a ping tool, a network trace tool and/or a packet loss measurement tool may be used to obtain the necessary information for selection of the default settings.

The Ping tool measures latency and bandwidth of the network between IP end-point devices and/or between end-point devices and the PBX. It may do so by measuring the round trip delay between an IP end-point device and a test point. Bandwidth is measured by measuring the throughput per second of a communication link. In cases where a voice path is directly between two IP end-point devices and not through an intermediary gateway, the test point requests the IP end-point devices to make the measurement on its behalf with respect to latency and bandwidth between the two IP end-point devices that are connected together. The test results become known to the terminal proxy server, which makes the decisions on these parameters on behalf of the IP end-point devices.

If the latency is low and the bandwidth is high, Table 2 is used to select a small number (about 1-4 frames by example only) of voice frames per packet. If the latency is high and the bandwidth is low, Table 1 is used to select a larger number (about 7-10 frames by example only) of voice frames per packet for optimum efficiency.

If the bandwidth is low, such as at 64 kbs, a CODEC with a high compression ratio should be used (as exemplified by G723.1) and the latency will always increase as a consequence. In general, the less bandwidth, the worse the latency will likely be. On the other hand, if the bandwidth is high, the latency could also be high if the CODEC selection, packet size and jitter buffer size is chosen poorly. By recognizing these conditions, however, appropriate changes may be made to these parameters to optimize latency and voice quality.

If there is spare bandwidth, then network efficiency becomes less of an issue. As a result, stuffing a small number, such as less than three, frames per packet produces less delay/latency and yields better voice quality.

The Network trace tool is used to determine the number of Router Hops between IP end-point devices and/or between the end-point devices and the PBX. If the number of hops is small (1-2 for example) and the bandwidth is high, a small number of frames per packet is used from Table 2 for G711. Otherwise, if the number of hops is large and the bandwidth is small, a large number of frames per packet is selected from Table 1 for G729A.

FIG. 2 illustrates a three-phase approach to optimize a VoIP connection, namely, initializing, network performance monitoring and dynamically intervening or correcting. The initializing phase has been discussed in detail with respect to FIG. 1 and involves optimizing the configuration of the end point devices. The end point is a frame of reference and can be regarded as either the terminal or the gateway.

Network performance monitoring involves periodically performing (e.g., every few minutes, or other time intervals), a maintenance task that measures the network performance. The maintenance task may involve the use of the Ping tool, the Network trace tool and/or the data packet loss measurement tool. If the network is found to have changed significantly as compared to its condition at the time of initialization, the steps mentioned for Initialization with respect to FIG. 1 may be repeated to re-optimize the network. This could be done automatically or at the request of an end-point device.

The default parameters for the end-point devices should be changed where the measured performance parameters signify that connection to the network is below a desired level of operation. If the latency exceeds 200 milliseconds, for instance, changes should be made to the default parameters. For instance, changing the default parameters for the packet size and CODEC type will help. If the bandwidth is below a threshold level of 128 kbs, the default parameters for the preferred CODEC type needs to be changed. If the packet loss is more than 5%, the default parameters should be changed to a low number of voice samples per frame.

The terminal proxy server and the end-point devices make the necessary measurements with the software tools and report the findings back to the terminal proxy server, which uses conventional protocol to instruct the end-point devices to make the appropriate changes in their default parameter settings. Conventional programming is used to implement the instructions from the terminal proxy server.

The next phase involves dynamic intervention or correction when the end point devices are active on a session. For example, during an active session, when two end-point devices are in voice communication, corrective measures may need to be taken to improve voice quality. Using intelligence in the IP sets, an indication of the voice quality is reported to a centralized terminal proxy server (see FIG. 3).

If the voice quality at either end-point device has degraded below a set threshold value, then the steps mentioned in connection with FIG. 1 at the time of initialization may be automatically implemented. Such degradation signifies that conditions of the network may have changed significantly as compared to the time of initialization. As the voice channel is re-optimizing, a slight interruption may occur in the voice path. The voice paths may be muted by the end points while this transition is taking place. This would make the transition seamless from an end user perspective. Preferably, the user is prompted to acknowledge that such re-optimization action is to be taken, although such prompting is hot required.

At the time of initialization, an IP-PBX may be used that could set certain parameters for each device. The parameters are the preferred CODEC, the number of Voice Samples per IP packet, and the jitter buffer size. For VoIP end-point devices that are installed on the same subnet, the IPAPBX may set the parameters the same as follows. The CODEC selection is G711, the number of voice samples that would be sent with each packet is less than five (and thus small, yielding approximately 50% overhead in the TCP/IP frame), and the jitter buffer selected would be very small or none.

This three-phase approach will give the best audio quality with the lowest amount of latency and will use the minimum amount of digital signal processor (DSP) resources. This approach, however, does not ensure a good connection, because it only optimizes the available connection. This approach works well if there is sufficient bandwidth on the local subnet and if the packet loss is small (this is very probable in this scenario).

For devices on a different Subnet, the IP-PBX may perform a number of tests before defaulting the system with the above parameters. However, to save processing time and power, it could default the system to the above parameters and then perform the tests to adjust the default settings as necessary based on results from the tests.

By pinging the end-points with data, it is possible to measure the throughput, latency and packet loss of the network connection. It is likely that a G729A CODEC, a much larger packet size (e.g., voice sample) and a sizable jitter buffer to allow for out of order packets would be selected.

By continually monitoring the network it is possible to dynamically change the default parameters associated with a VoIP end point so that when a new call is started or received the network connection is optimized.

If a network is experiencing performance issues during a VoIP call, the IP-PBX could either automatically re-negotiate the CODEC connection and re-set the parameters for packet size and/or jitter buffer. The option to perform such dynamic intervention during media transmission could also be provided to the user with a manual interface to start this activity (e.g., similar to the "scan" button on a cordless phone).

Since the bandwidth of the spectrum is much more limited for wireless devices than for that of a wired LAN, the default parameters could be set based on whether the WLAN was a direct sequence spread spectrum (DSSS) (such as 11 mbs) or a frequency hopping (FH) spread spectrum (such as 2 mbs) or other type of spread spectrum. DSSS and FH spread spectrum are two types of modulation techniques for use in wireless communication systems. Depending upon system requirements, each modulation has its set of advantages and disadvantages. In a messaging environment, frequency hopping is more attractive than direct sequence because it requires no power control at a portable subscriber unit or end-point device. DS is more attractive for location finding applications (using time of arrival) or where spectral reconstruction can be used in interference cancellation.

As a consequence of following this three-phase approach, voice quality becomes optimized for those IP networks that have not been provisioned for quality of service (QoS) and is further optimized if the network employs QoS measures. This is a self-learning and self-correcting solution to maximize voice and other media performance in an IP network.

While the foregoing description and drawings represent the preferred embodiments of the present invention, it will be understood that various changes and modifications may be made without departing from the spirit and scope of the present invention.

We claim:

1. A method of setting up a voice communication session in a packet switched network, the method comprising:
   initializing an end-point device on a network, wherein the initializing comprises setting at least one initial parameter affecting packetized voice operation of the end-point device and performing at least one test to determine a configuration for the end-point device associated with a desired level of performance of the network measured at the end-point device;
   measuring at least one performance parameter of the network external to the end-point device; and
   evaluating whether the measured performance parameter indicates that a connection to the network is below the desired level of performance and, if so, transmitting an indication that the connection to the network is below the desired level of performance.

2. The method of claim 1, wherein the at least one initial parameter comprises at least one of:
   identification of at least one CODEC;
   at least one CODEC parameter;
   a number of voice samples per packet; and
   a jitter buffer size.

3. The method of claim 1, comprising responding to the indication that the connection to the network is below the desired level of performance by changing at least one of the at least one initial parameter of the end-point device.

4. The method of claim 3, wherein changing the at least one of the at least one initial parameter of the end-point device comprises performing at least one of:
   selecting a different CODEC for the connection;
   changing at least one CODEC parameter;
   changing packet size parameters; and
   changing a jitter buffer size.

5. The method of claim 3, wherein changing the at least one of the at least one initial parameter of the end-point device is initiated by a user.

6. The method of claim 3, wherein changing the at least one of the at least one initial parameter comprises changing the at least one of the at least one initial parameter during transmission of media to the end-point device.

7. The method of claim 1, wherein measuring the at least one performance parameter comprises measuring at least one of:
   throughput;
   latency;
   packet loss;
   bandwidth;
   number of network hops to the end-point device; and
   round trip delay.

8. The method of claim 1, wherein measuring the at least one performance parameter comprises measuring performance with at least one of:
   a ping tool;
   a network trace tool; and
   a packet loss measurement tool.

9. The method of claim 1, comprising registering the end-point device with a Private Branch Exchange (PBX) on the network.

10. The method of claim 9, wherein measuring the at least one performance parameter comprises measuring with the PBX at least one performance parameter characterizing the network between the PBX and the end-point device.

11. A system for setting up a voice communication session in a packet switched network, the system comprising:
    an initialization sub-system configured to initialize at least one initial parameter for an end-point device on a network and to perform at least one test to determine a configuration for the end-point device associated with a desired level of performance of the network measured at the end-point device;
    a measurement sub-system configured to measure at least one performance parameter of the network external to the end-point device;
    an evaluation sub-system configured to make a determination as to whether the at least one performance parameter indicates that a connection to the network is below the desired level of performance; and
    at least one transmitter configured to transmit an indication that the connection to the network is below the desired level of performance.

12. The system of claim 11, wherein the at least one initial parameter comprises at least one of:
    identification of at least one CODEC;
    at least one CODEC parameter;
    a number of voice samples per packet; and
    a jitter buffer size.

13. The system of claim 11, comprising a parameter change sub-system responsive to the indication that the connection to the network is below the desired level of performance to change at least one of the at least one initial parameter of the end-point device.

14. The system of claim 13, wherein the parameter change sub-system is configured to perform at least one of:
    selecting a different CODEC for the connection;
    changing at least one CODEC parameter;
    changing packet size parameters; and
    changing a jitter buffer size.

15. The system of claim 13, wherein the parameter change sub-system is configured to enable user initiation of changes to the at least one initial parameter of the end-point device.

16. The system of claim 13, wherein the parameter change sub-system is configured to change at least one of the at least one parameter during transmission of media to the end-point device.

17. The system of claim 13, wherein the parameter change sub-system is at least partially implemented in a network server.

18. The system of claim 13, wherein the parameter change sub-system is at least partially implemented in at least one end-point device.

19. The system of claim 13, wherein the parameter sub-system is partially implemented in a network server and partially implemented in the end-point device.

20. The system of claim 11, wherein the measurement sub-system is configured to measure at least one of:
    throughput;
    latency;
    packet loss;
    bandwidth;
    number of network hops to the end-point device; and
    round trip delay.

21. The system of claim 11, wherein the measurement sub-system is configured to measure performance with at least one of:
    a ping tool;
    a network trace tool; and
    a packet loss measurement tool.

22. The system of claim 11, comprising a registration entity configured to register the end-point devices with a Private Branch Exchange (PBX) on the network.

23. The system of claim 22, wherein the PBX is configured to measure at least one performance parameter characterizing the network between the PBX and the end-point device.

24. The system of claim 11, wherein the initialization sub-system is at least partially implemented in a network server.

25. The system of claim 11, wherein the initialization sub-system is at least partially implemented in at least one end-point device.

26. The system of claim 11, wherein the initialization sub-system is partially implemented in a network server and partially implemented in the end-point device.

27. The system of claim 11, wherein the initialization sub-system is at least partially implemented in a PBX.

28. The system of claim 11, wherein the measurement sub-system is at least partially implemented in a network server.

29. The system of claim 11, wherein the measurement sub-system is at least partially implemented in at least one end-point device.

30. The system of claim 11, wherein the measurement sub-system is partially implemented in a network server and partially implemented in the end-point device.

31. The system of claim 11, wherein the evaluation sub-system is at least partially implemented in a network server.

\* \* \* \* \*